United States Patent
Chen et al.

(10) Patent No.: US 7,277,279 B2
(45) Date of Patent: Oct. 2, 2007

(54) MOUNTING APPARATUS FOR DATA STORAGE DEVICE

(75) Inventors: Yun-Lung Chen, Tu-Cheng (TW); Lin Ding, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 437 days.

(21) Appl. No.: 10/989,705

(22) Filed: Nov. 16, 2004

(65) Prior Publication Data

US 2005/0135051 A1    Jun. 23, 2005

(30) Foreign Application Priority Data

Dec. 23, 2003   (TW)   .............................. 92222473 U

(51) Int. Cl.
*H05K 5/00*   (2006.01)
*A47B 81/00*  (2006.01)

(52) U.S. Cl. .................... 361/685; 361/683; 312/223.2

(58) Field of Classification Search ................ 361/685, 361/825, 724–727; 360/97.07; 369/75.1; 312/223.1, 223.2
See application file for complete search history.

(56) References Cited

U.S. PATENT DOCUMENTS 6,386,656 B1 *  5/2002  Chen ....................... 312/223.2
6,826,044 B2 * 11/2004  Gan et al. .................... 361/685
6,930,249 B2 *  8/2005  Chen et al. .................... 174/50
7,102,886 B2 *  9/2006  Peng et al. ................. 361/685
2002/0172003 A1 * 11/2002  Bang et al. ................. 361/683
2005/0201052 A1 *  9/2005  Chen et al. ................. 361/685
2005/0243507 A1 * 11/2005  Lambert et al. ............ 361/685
2006/0290246 A1 * 12/2006  Chen et al. .............. 312/223.2
2007/0019377 A1 *  1/2007  Chen et al. ................. 361/685

FOREIGN PATENT DOCUMENTS

TW          537425         6/2003

* cited by examiner

*Primary Examiner*—Jayprakash Gandhi
*Assistant Examiner*—Zachary M Pape
(74) *Attorney, Agent, or Firm*—Wei Te Chung

(57) ABSTRACT

A mounting apparatus for drive bracket comprises a chassis (70) forming a front plate (73), a drive bracket (10) mounted on the chassis and a locking device (30). The drive bracket comprises a joint plate (26), and the joint plate comprises a confining hole (18) and a baffle (24) therein. The locking device comprises a sliding portion (32) slidably mounted to the front plate and an elastic patch (46) arranged on the sliding portion, a confining patch (34) is attached to the upper edge of the sliding portion and a locking patch (44) extends downwardly from the bottom edge of the sliding portion. When assembling, the drive bracket stays in the chassis, the confining patch is engaging in the confining hole, the elastic patch presses the baffle; when disassembling the drive bracket is pushed outwardly by the elastic patch pressing the baffle.

20 Claims, 6 Drawing Sheets

MOUNTING APPARATUS FOR DATA STORAGE DEVICE

BACKGROUND OF THE INVENTION

1. Field of the Invention

The present invention relates to mounting apparatus, and particularly to a mounting apparatus for steadily and securely mounting a data storage device therein.

2. Description of the Related Art

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional drive bracket is generally attached to a computer enclosure by bolts or rails. Fixing the drive bracket to the computer enclosure with bolts is unduly laborious and time-consuming. Furthermore, the computer enclosure needs extra operating space for carrying out the fixing operation. Since components of a computer are compactly arranged in a computer enclosure, the assembly and disassembly thereof is complicated and low efficient. Moreover, the components may be destroyed by inadvertent operation. Fixing a drive bracket in a computer base using rails is more convenient than using the above-described bolts. However, the rails are generally made of plastic. This leads to extra maintenance because of the plastic rails easily wearing out and resultantly needing replacement.

Another computer enclosure with drive bracket assembly is disclosed in Taiwan patent application No. 091212339. The drive bracket assembly comprises a drive bracket, an assembly panel, and a positioning device. A clip plate, which can move in lateral directions, is formed on a side plate of the drive bracket. The clip plate has elastic restoring force. A bevel guiding edge and a clip slot are formed at a front edge of the clip plate. A clip member is formed on the assembly panel corresponding to the clip slot. The assembly panel can be a surface of a computer base or an inner surface of a computer enclosure. The positioning device comprises at least a guiding groove and a corresponding positioning member. The guiding groove and the positioning member are formed on a proper position between the drive bracket and the assembly panel. The positioning member is engaged in the clip slot of the clip plate to secure the bracket on the assembly panel. The clip plate is moved away to make the positioning member disengage from the clip slot, thus the bracket is disassembled from the assembly panel. However, the assembly and disassembly of the drive bracket still need to be operated in inner space of a computer enclosure.

Thus an improved computer enclosure which overcomes the above-mentioned problems is desired.

BRIEF SUMMARY OF THE INVENTION

Accordingly, an object of the present invention is to provide a mounting apparatus for readily and securely installing and removing a data storage device to and from equipment such as a chassis of a computer.

To achieve the above object, the mounting apparatus for data storage device comprises a chassis forming a front plate, a drive bracket slidably attached to the chassis and a locking device. The drive bracket comprises a joint plate, and the joint plate comprises a confining hole and a baffle therein. The locking device comprises a sliding portion movably mounted to the front plate and an elastic patch arranged on the sliding portion, a confining patch is attached to an upper edge of the sliding portion and a locking patch extends downwardly from an bottom edge of the sliding portion. When assembling, the drive bracket stays in the chassis, the confining patch is engaging in the confining hole, the elastic patch presses the baffle; when disassembling the drive bracket is pushed outwardly by the elastic patch pressing the baffle.

A principal advantage of this embodiment is that the mounting apparatus for data storage device can remind users the uninstalling direction and make the uninstallation quicker and easier.

Other objects, advantages and novel features of the present invention will become more apparent from the following detailed description when taken in conjunction with the accompanying drawings, in which:

DETAILED DESCRIPTION OF THE INVENTION

Figure 1:
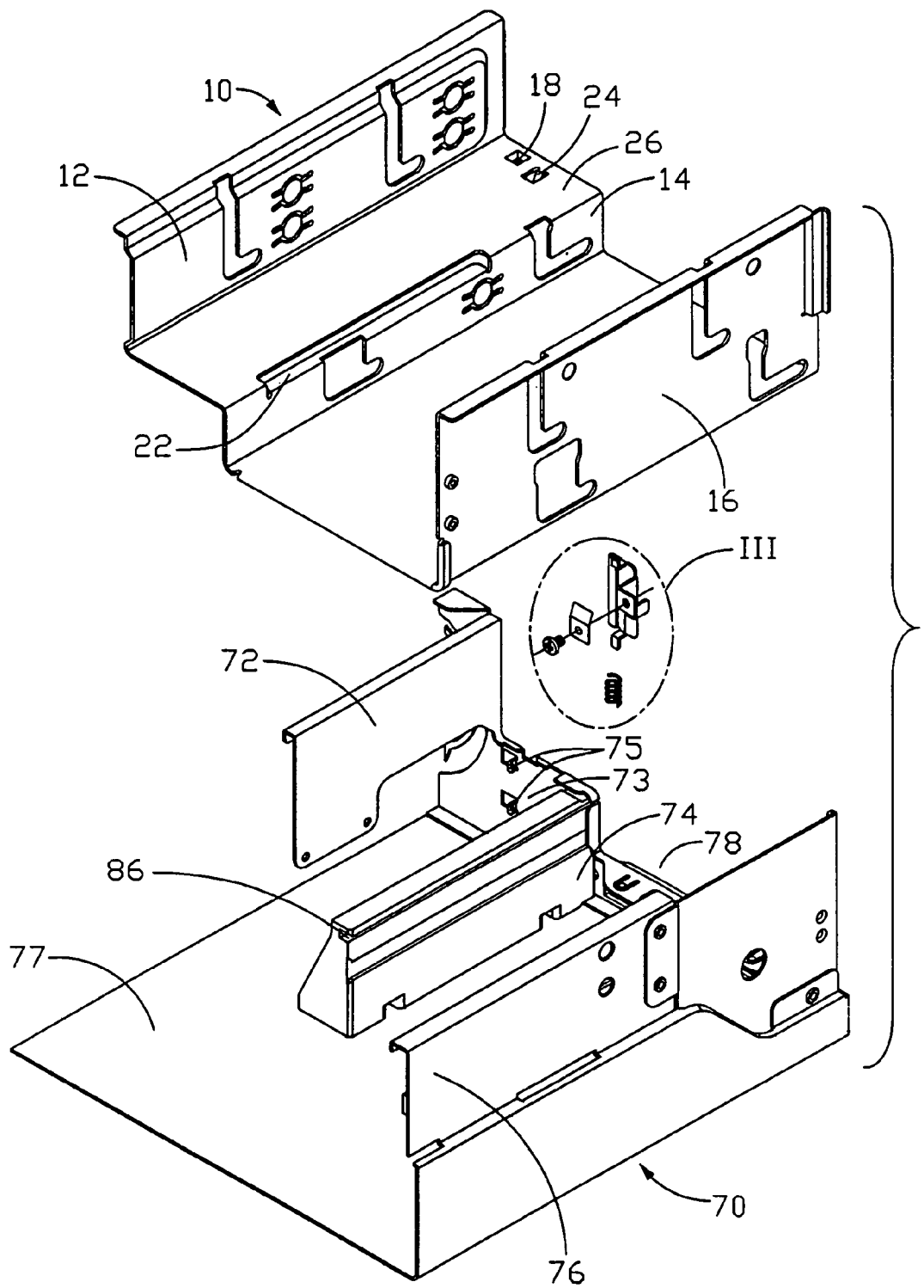
FIG. 1 is an exploded, isometric view of the mounting apparatus in accordance with the preferred embodiment of the present invention, the mounting apparatus comprising a chassis, a drive bracket and a locking device.
Figure 2:
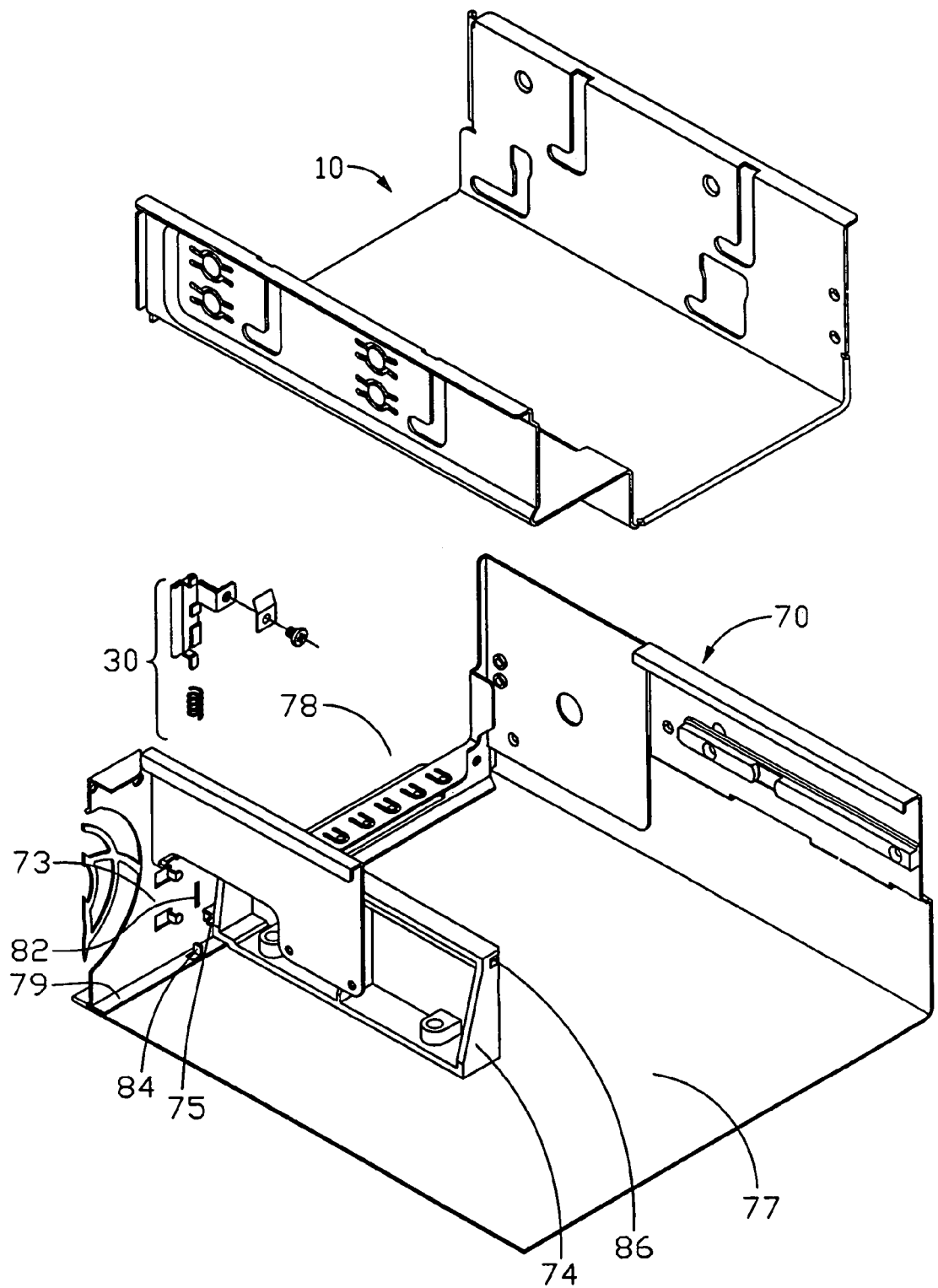
FIG. 2 is an exploded, isometric view of the mounting apparatus, which is similar to FIG. 1 but from viewed another aspect.
Figure 3:
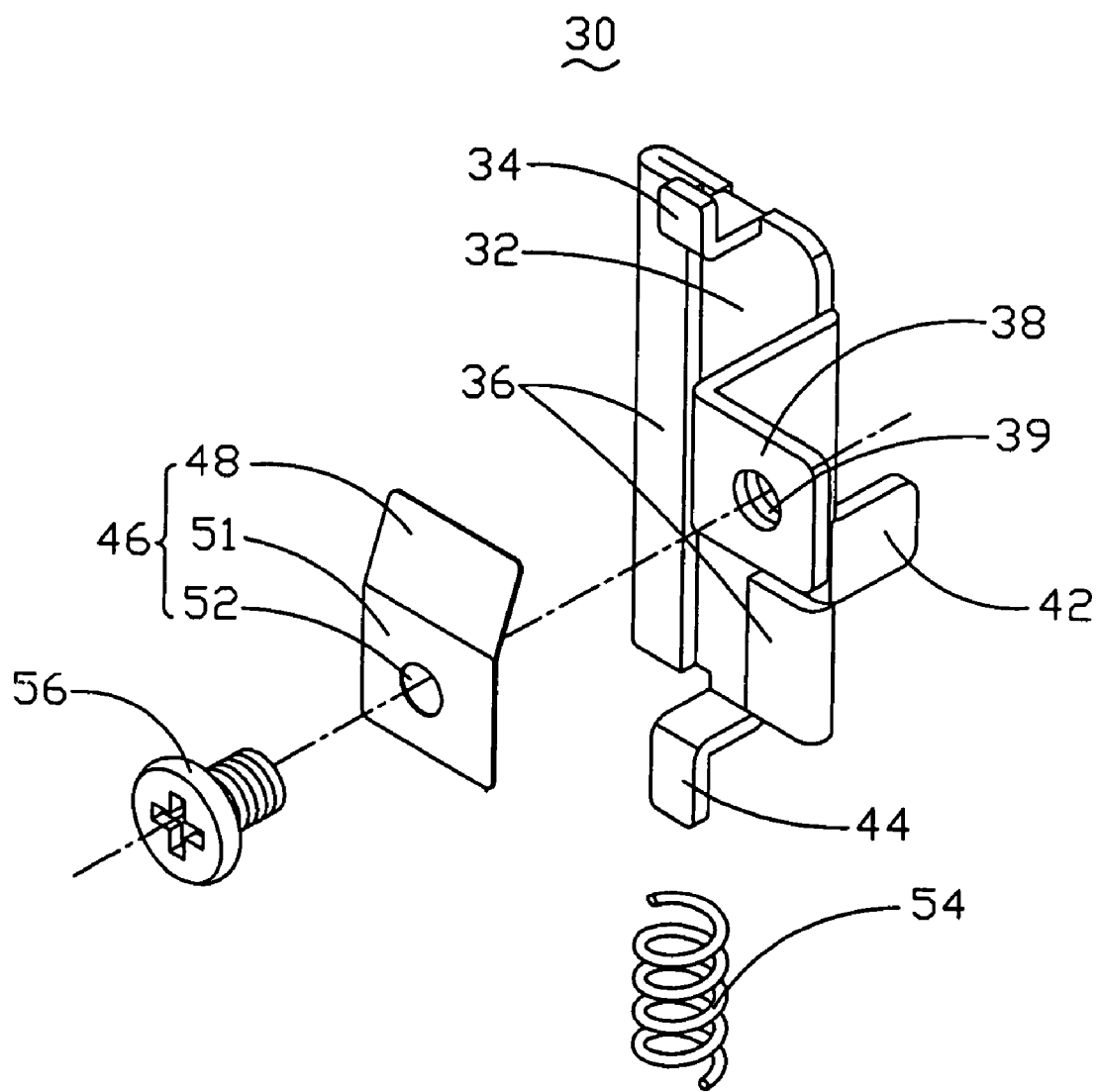
FIG. 3 is an enlarged view of the locking device in the mounting apparatus taken from the encircled portion III of FIG. 1.

Referring to FIGS. 1, 2 and 3, a mounting apparatus for data storage devices (not shown) in accordance with the preferred embodiment of the invention, comprises a drive bracket 10, a locking device 30 and a chassis 70 of an electronic device like a computer. The drive bracket 10 is an integrative pane with ladder bend. The drive bracket 10 includes a first side wall 12, a second side wall 14 and a third side wall 16 which are all parallel to each other. There is a joint plate 26 between the first side wall 12 and the second side wall 14, on which defines a confining hole 18 and a downwardly baffle 24. The confining hole 18 is defined due to downwardly depressing of the joint plate 26 with each side is an inverse trapezium. A sliding slice 22 is stamped outwardly from the joint of the second side wall 14 and the joint plate 26.

The locking device 30 includes a sliding portion 32, an elastic patch 46, a spring 54 and a screw 56. The sliding portion 32 is approximately a rectangle lathing. An L-shaped locking patch 44 is bent from a bottom of the sliding portion 32 outwardly and downwardly for connecting with an end of the spring 54. An L-shaped fixing patch 38 extends from an upper portion of a long side of the sliding portion 32. A first screw bole 39 is defined in the fixing patch 38. An operating part 42 vertically extends from the long side of the sliding portion 32 in a direction contrary with that of the fixing patch 38 and located below the fixing patch 38. Two long sides of the sliding portion 32 are overlapping bent to form bending parts 36. The elastic patch 46 is a metal sheet and includes a pressing part 48 and a fixing part 51. The fixing part 51 defines a second screw hole 52.

The computer chassis 70 includes a first container wall 72, a support wall 74, a second container wall 76 and a bottom plate 77. The support wall 74 is a plastic block, which is vertical to the bottom plate 77 and parallel to the first container wall 72 and the second container wall 76. A front plate 73 is formed at the joint of the first container wall 72 and the support wall 74. A plurality of L-shaped catches 75 is formed inwardly from the front plate 73. The catches 75 fix the locking device 30 to the front plate 73 of the chassis 70. An opening 78 is defined in the front plate 73 corresponding to a ladder-shaped cross-section of the drive bracket 10. A vertical slot 82 is defined in the middle of the front plate 73, which is used to hold the operating part 42 of the locking device 30. A lower part of the front plate 73 inwardly forms a hem 79. A fixing tab 84 protrudes upwardly from the hem 79 below the catches 75. The fixing tab 84 can be also directly stamped from the bottom plate 77. A sliding slot 86 is defined in the support wall 74 according to the sliding slice 22 of the second slide wall 14 of the drive bracket 10.

Figure 4:
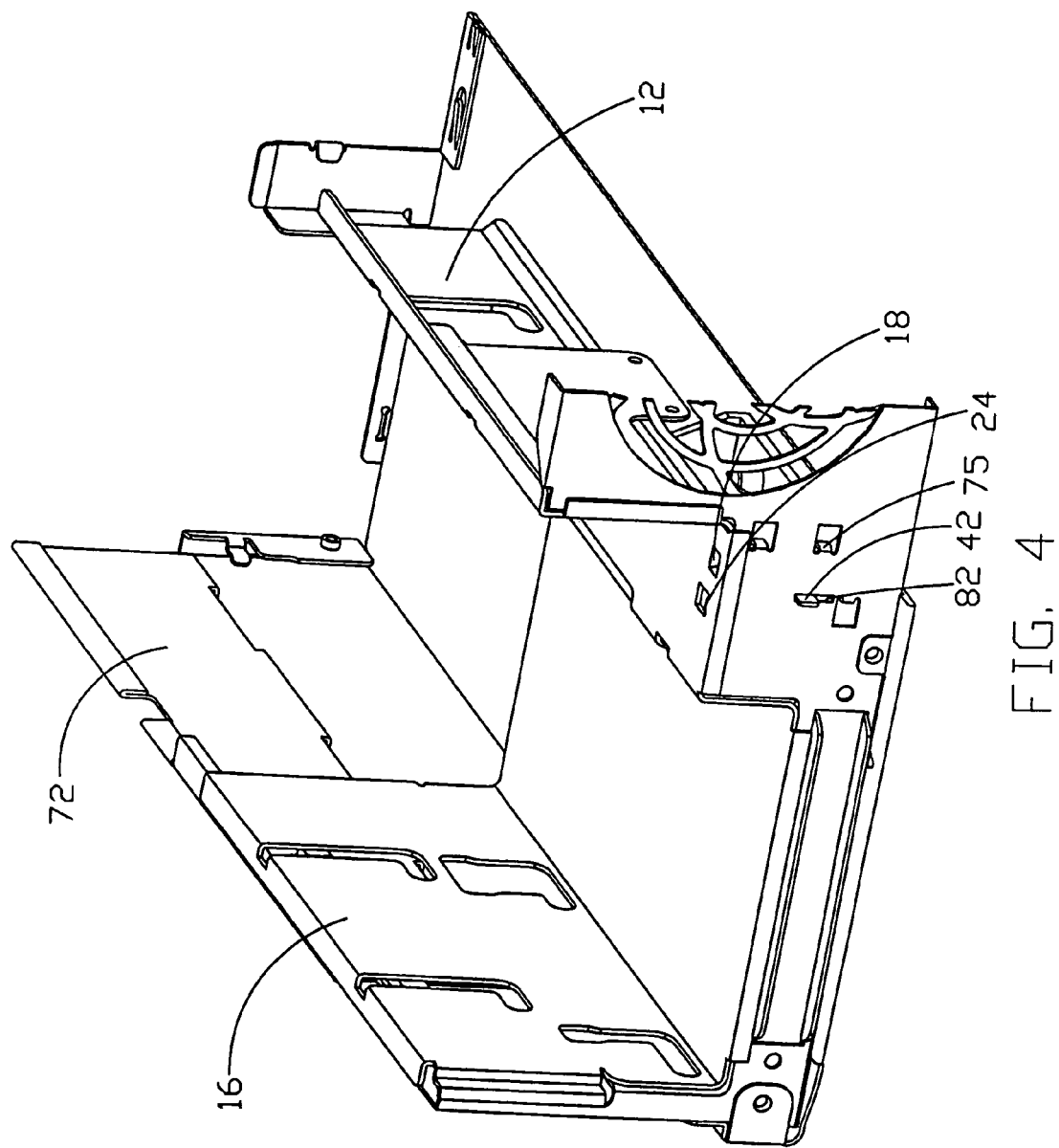
FIG. 4 is an isometric view illustrating the drive bracket assembling to the chassis with the locking device in a locked position.
Figure 5:
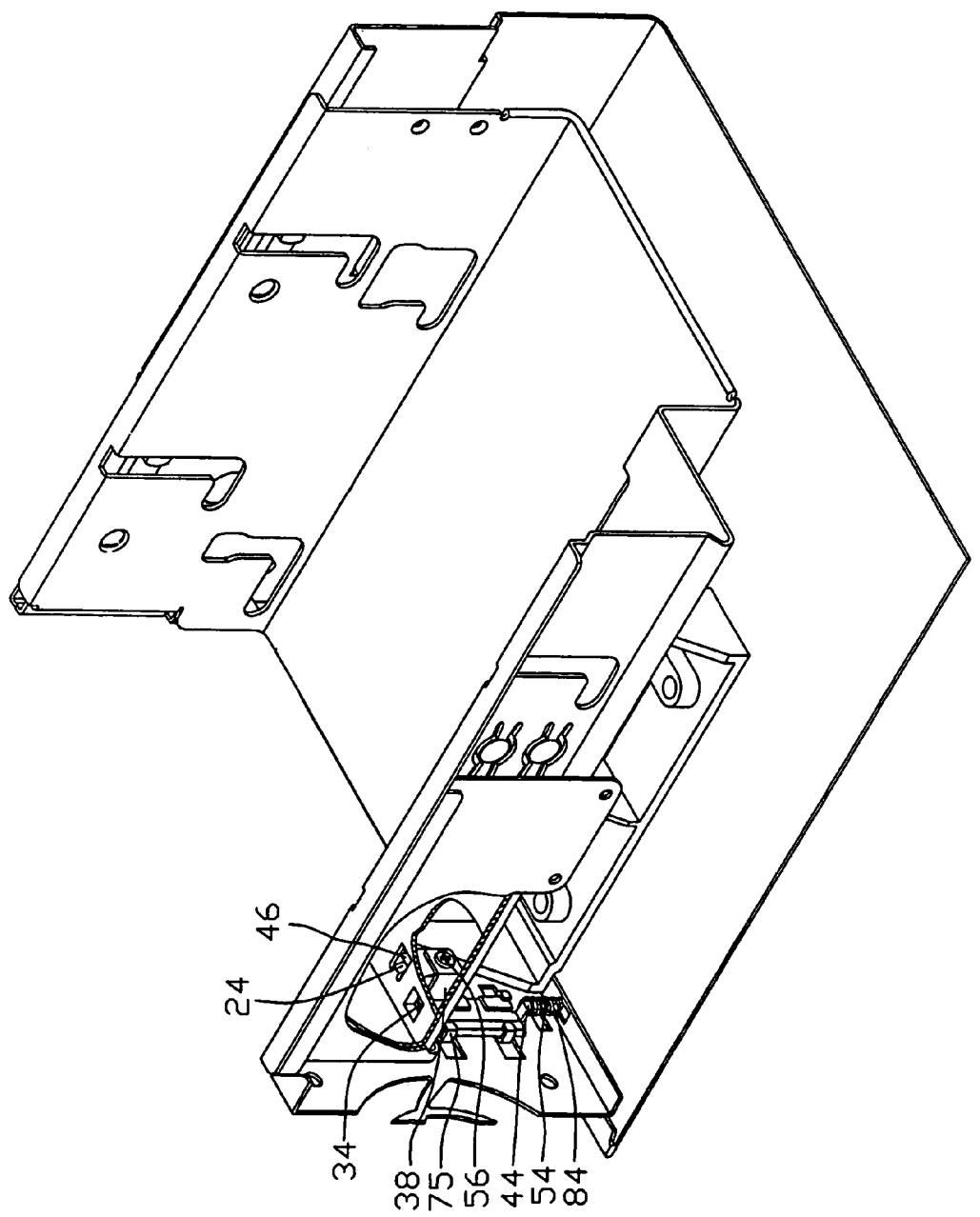
FIG. 5 is an isometric view illustrating the drive bracket assembling to the chassis with the locking device in a locked position from another aspect.
Figure 6:
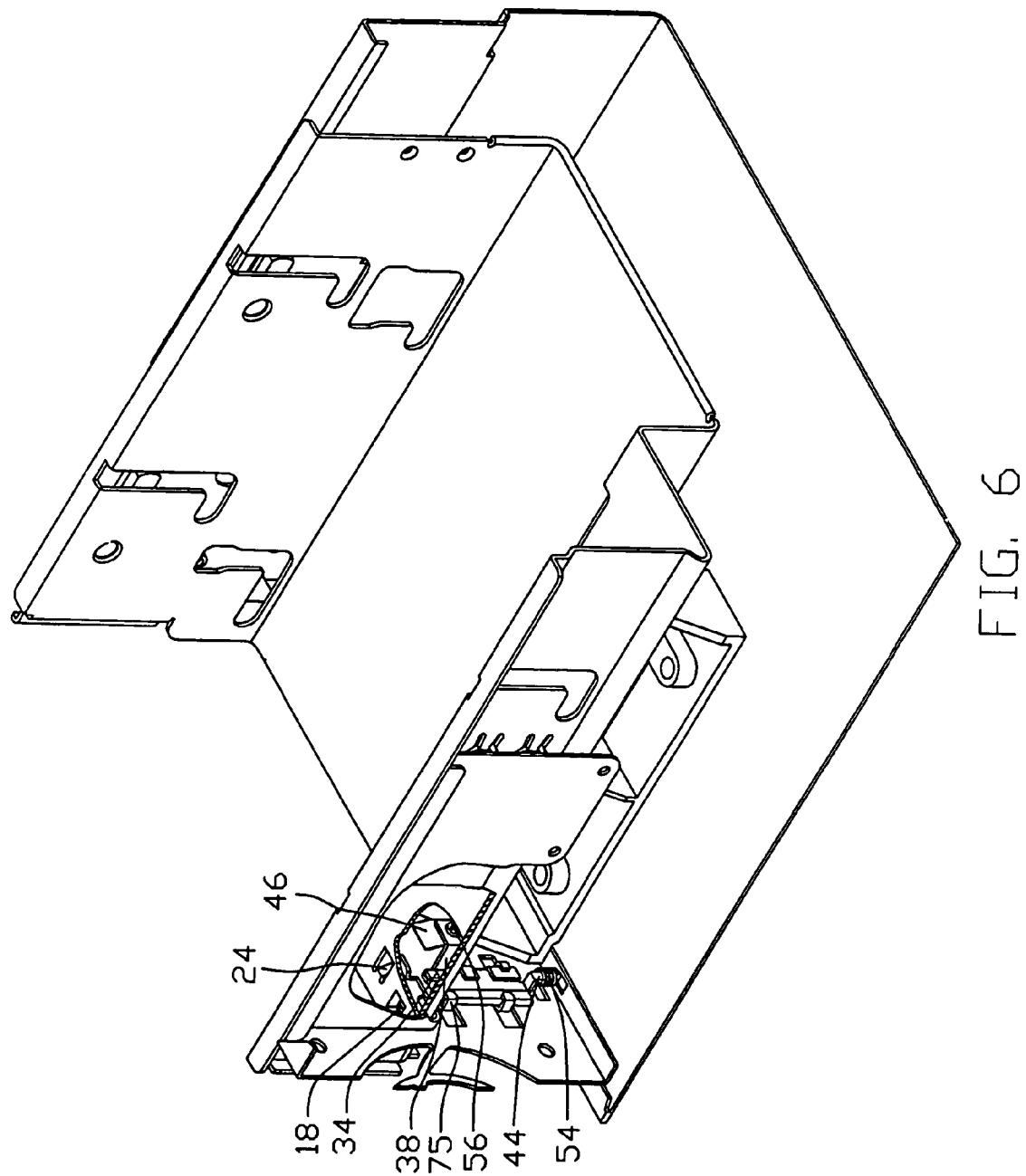
FIG. 6 is an isometric view illustrating the drive bracket assembling to the chassis with the locking device in an unlocked position.

Referring also to FIG. 4 to FIG. 6, in assembly, the elastic patch 46 incorporates with the fixing patch 38 by the screw 56. The bending parts 36 of the sliding portion 32 are installed in the catches 75 of the front plate 73. The operating part 42 of the sliding portion 32 extends through the slot 82 of the front plate 73. Two ends of the spring 54 are respectively fixed with the locking patch 44 of the sliding portion 32 and the fixing patch tab 84 of the chassis 70. The drive bracket 10 is moved in the chassis 70 inwardly through the opening 78. The sliding slice 22 slides along the sliding slot 86 of the support wall 74. When the confining patch 34 slides to the confining hole 18 along a slope of the confining hole 18, the spring 54 is elastically deformed, then the confining patch 34 falls in the confining hole 18 via the restoring force of the spring 54. Consequently, the drive bracket 10 is fixed with the chassis 70. Synchronously, the pressing part 48 of the elastic patch 46 moves slightly with the locking device 30 and stays above the baffle 24 of the drive bracket 10 when the baffle 24 moves near the pressing part 48 with the drive bracket 10 and is slightly elastically deformed due to engagement of the baffle 24 and the pressing part 48. Upper edges of the first side wall 12 and the third side wall 16 of the drive bracket 10 are slidably support by connect to the first container wall 72 and the second container wall 76 of the chassis 70, which strengthen the joint of the drive bracket 10 and the chassis 70.

In disassembly, press the operating part 42 of the sliding portion 32 downwardly, the spring 54 is compressed by the sliding portion 32. The confining patch 34 is released from the confining hole 18, synchronously, with the force by the elastic patch 46 pressing the baffle 24, the drive bracket 10 is pushed to move outwardly along the sliding slot 86, so that users can easily take out the drive bracket 10.

The elastic patch 46 may be other elastic component, and the means for jointing the elastic patch 46 and the fixing patch 38 doesn't limit to the screw, other fixing means such as riveting or soldering is acceptable. The sliding portion 32 may be slidably attached to the front plate 73 by other means.

It is to be understood, however, that even though numerous characteristics and advantages of the present invention have been set forth in the foregoing description, together with details of the structure- and function of the invention, the disclosure is illustrative only, and changes may be made in detail, especially in matters of type, arrangement of components within the principles of the invention to the full extent indicated by general meaning of the terms in which the appended claims are expressed.

What is claimed is:

1. A mounting apparatus, comprising:
   a chassis comprising a bottom plate, a front plate and a first container wall and a second container wall extending upwardly from the bottom plate, an opening defined in the front plate;
   a drive bracket slid in the chassis through the opening, the drive bracket comprising two opposite side walls and a joint portion between the two opposite side walls, the joint portion comprises a confining hole and a baffle; and
   a locking device slidably mounted to the front plate of the chassis, the locking device comprising a sliding portion and an elastic patch, the sliding portion forming a confining patch on an upper edge thereof;
   wherein when the drive bracket slides into the chassis, the confining patch engages in the confining hole, and the elastic patch presses the baffle.

2. The mounting apparatus as claimed in claim 1, wherein the joint portion comprises a joint plate and a second side wall bent downwardly from the joint plate, a sliding slice is formed in the joint of the joint plate and the second side wall.

3. The mounting apparatus as claimed in claim 2, wherein the confining hole is depressed downwardly from the joint plate, a front wall of the confining hole is slanted.

4. The mounting apparatus as claimed in claim 2, wherein the chassis comprises a support wall, a sliding slot is defined in the support wall to contain the sliding slice.

5. The mounting apparatus as claimed in claim 1, wherein the sliding portion comprises a locking portion and a spring connecting the locking portion to the chassis.

6. The mounting apparatus as claimed in claim 1, wherein the sliding portion further comprises an L-shaped fixing patch extending from the sliding portion, the fixing patch defines a screw hole for fixing the elastic patch.

7. The mounting apparatus as claimed in claim 1, wherein the sliding portion further comprises an operating part extending through a vertical slot of the slot plate.

8. A mounting apparatus comprising:
   a computer chassis comprising a front plate, an opening defined in the front plate;
   a drive bracket slid in the chassis through the opening in a front-to-back direction, the drive bracket defining a confining hole and forming a slanted baffle; and
   a locking device comprising a sliding portion attached to the front plate and being slidable in an up-and-down direction, a confining patch formed on an upper portion of the sliding portion, the locking device being connected to the chassis via a resilient element, a slanted elastic patch arranged on the locking device; wherein when the drive bracket is moved in the chassis, the confining patch of the sliding portion engages in the confining hole of the drive bracket, the baffle is biased against the elastic patch; when the sliding portion is moved downwardly to release the confining patch from the confining hole, the elastic patch pushes the drive bracket out through the opening.

9. The mounting apparatus as claimed in claim 8, wherein the drive bracket further comprising a second side wall bent downwardly from the joint plate, a sliding slice is formed on the joint of the second side wall and the joint plate.

10. The mounting apparatus as claimed in claim 9, wherein the chassis comprises a support wall, a sliding slot is defined in the support wall to contain the sliding slice.

11. The mounting apparatus as claimed in claim 8, wherein the confining hole is depressed downwardly from the joint plate.

12. The mounting apparatus as claimed in claim 8, wherein a L-shaped fixing patch extends from a longer fringe of the sliding portion, a round screw hole for fixing the elastic patch is defined on the fixing patch.

13. The mounting apparatus as claimed in claim 8, wherein the sliding portion further comprises an operating part extending through a vertical slot of the front plate.

14. The mounting apparatus as claimed in claim 8, wherein the bottom edge of the front plate bends inwardly perpendicularly.

15. The mounting apparatus as claimed in claim 14, wherein a fixing tab protrudes perpendicularly from the bend cooperating with a locking patch of the sliding portion fix the resilient element.

16. The mounting apparatus as claimed in claim 15, wherein the resilient element is a spring.

17. A mounting apparatus for mounting a data storage device to a chassis of an electronic device, comprising:
   an opening defined along a plate of said chassis;
   a bracket adapted for accommodating and holding said data storage device therein, and slidably movable through said opening to a final position thereof in said chassis along a first direction; and
   a locking device attached to said plate of said chassis and resiliently movable along a second direction between a first position where said locking device engages with said bracket to confine said bracket in said final position thereof a second position where said locking device moves away from said bracket to release said bracket and gains a resilient force to move back to said first position, said locking device movable from said first position to said second position by means of movement of said bracket along said first direction.

18. The mounting apparatus as claimed in claim 17, wherein said bracket defines a confining hole and said locking device defines a confining patch, and engagement of said confining patch and said confining hole allows said locking device to confine said bracket in said final position thereof.

19. The mounting apparatus as claimed in claim 17, further comprising a slanted baffle formed in said bracket and a slanted elastic patch formed with said locking device, engagement of said slanted patch and said baffle providing a driving force on said bracket to move out of said chassis through said opening away from said final position thereof.

20. The mounting apparatus as claimed in claim 17, wherein said second direction is along said plate and said first direction is perpendicular to said second direction.

* * * * *